(12) United States Patent
Kief et al.

(10) Patent No.: US 6,775,108 B2
(45) Date of Patent: *Aug. 10, 2004

(54) MAGNETIC HEAD HAVING A READ ELEMENT SHIELD AND SUBSTRATE WITH MATCHING COEFFICIENTS OF THERMAL EXPANSION

(75) Inventors: Mark T. Kief, Savage, MN (US); Ladislav R. Pust, Savage, MN (US); Venkateswara R. Inturi, Shakopee, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 10/125,750

(22) Filed: Apr. 18, 2002

(65) Prior Publication Data

US 2003/0086215 A1 May 8, 2003

Related U.S. Application Data

(60) Provisional application No. 60/340,042, filed on Nov. 2, 2001.

(51) Int. Cl.$^7$ ................................................ G11B 5/39
(52) U.S. Cl. ..................................................... 360/319
(58) Field of Search ............................... 360/317, 319, 360/324.1, 324.11, 324.12, 324.2

(56) References Cited

U.S. PATENT DOCUMENTS

| | | | | |
|---|---|---|---|---|
| 5,818,684 A | * | 10/1998 | Iwasaki et al. | ............... 360/319 |
| 5,838,521 A | * | 11/1998 | Ravipati | ...................... 360/319 |
| 5,969,910 A | * | 10/1999 | Imagawa et al. | ........... 360/319 |
| 6,137,652 A | | 10/2000 | Ezaki et al. | ................ 360/113 |
| 6,144,533 A | | 11/2000 | Fukuda et al. | .............. 360/313 |
| 6,150,046 A | | 11/2000 | Watanabe et al. | ........... 428/694 |
| 6,151,193 A | | 11/2000 | Terunuma et al. | .......... 360/126 |
| 6,169,646 B1 | * | 1/2001 | Macken et al. | ............. 360/319 |
| 6,210,543 B1 | | 4/2001 | Kobayashi | ............... 204/192.2 |
| 6,245,450 B1 | | 6/2001 | Kawawake et al. | ......... 428/692 |
| 6,252,748 B1 | | 6/2001 | Yamanaka et al. | .......... 360/317 |
| 6,258,470 B1 | | 7/2001 | Sakakima et al. | .......... 428/692 |
| 6,275,360 B1 | * | 8/2001 | Nakamoto et al. | .......... 360/319 |
| 6,292,334 B1 | * | 9/2001 | Koike et al. | ................. 360/319 |
| 6,385,015 B2 | * | 5/2002 | Narumi et al. | .............. 360/319 |
| 6,430,009 B1 | * | 8/2002 | Komaki et al. | ............. 360/319 |
| 6,437,949 B1 | * | 8/2002 | Macken et al. | ............. 360/319 |
| 6,456,466 B1 | * | 9/2002 | Nakamoto et al. | .......... 360/319 |
| 6,456,467 B1 | * | 9/2002 | Mao et al. | ................... 360/319 |
| 6,496,335 B2 | * | 12/2002 | Gill | ............................ 360/319 |
| 6,563,677 B2 | * | 5/2003 | Narumi et al. | .............. 360/319 |
| 6,580,586 B1 | * | 6/2003 | Biskeborn | .................... 360/319 |
| 6,654,209 B2 | * | 11/2003 | Seigler et al. | .............. 360/322 |
| 2001/0028538 A1 | * | 10/2001 | Watanabe et al. | ........... 360/319 |
| 2003/0081359 A1 | * | 5/2003 | Pust et al. | ................... 360/319 |

\* cited by examiner

*Primary Examiner*—Jefferson Evans
(74) *Attorney, Agent, or Firm*—Westman, Champlin & Kelly

(57) ABSTRACT

A magnetic head for reading information from a magnetic medium is provided. The magnetic head includes a substrate, having a substrate thermal coefficient of expansion, and a read element positioned above the substrate. The head also includes a shield, positioned above the substrate and adjacent the read element, which has a shield thermal coefficient of expansion that substantially matches the substrate thermal coefficient of expansion. The shield absorbs stray magnetic fields from the magnetic medium, which emanate from stored data that is adjacent to a data element that is directly beneath and read by the magnetoresistive read element. This shield may also serve to provide electrical contact for the read element. The magnetic thermal coefficient of expansion and electrical properties of the shield may be suitably optimized through appropriate choice of component materials and structure.

32 Claims, 9 Drawing Sheets

US 6,775,108 B2

MAGNETIC HEAD HAVING A READ ELEMENT SHIELD AND SUBSTRATE WITH MATCHING COEFFICIENTS OF THERMAL EXPANSION

CROSS-REFERENCE TO RELATED APPLICATION

This application claims priority from U.S. Provisional Application No. 60/340,042 filed on Nov. 2, 2001 for inventors Mark T. Kief, Ladislav R. Pust and Venkateswara R. Inturi and entitled "RECORDING HEAD SHIELD MATERIALS ALLOWING OPTIMAL MAGNETIC AND THERMAL-MECHANICAL PROPERTIES," which is herein incorporated by reference.

FIELD OF THE INVENTION

The present invention relates generally to magnetic data storage systems, and more particularly but not by limitation to a magnetic read element shield used in such systems.

BACKGROUND OF THE INVENTION

Magnetoresistive (MR) read heads are typically formed of various layers deposited upon a substrate. MR read heads utilize a MR element positioned between a top and a bottom shield to read magnetically-encoded information from a magnetic medium, such as a disc, by detecting magnetic flux stored on the magnetic medium. The read element may be an anisotropic magnetoresistive (AMR) element, a giant magnetoresistive (GMR) stack or other suitable type of transducer. An AMR element is typically fabricated from iron, nickel, or cobalt-based soft ferromagnetic alloys; whereas a GMR stack is a multi-layered structure generally having two separate layers formed from iron, nickel or cobalt-based soft ferromagnetic alloys separated by a spacer layer formed from non-magnetic materials, such as copper, silver, or gold.

During a read operation, the top and bottom shields ensure that the read element reads only the information stored directly beneath it on a specific track of the magnetic medium or disc by absorbing any stray magnetic fields emanating from adjacent tracks and transitions. Accordingly, the shields are formed of materials having relatively high permeability, low magnetostriction and low coercivity.

In the magnetic recording industry, the drive towards increased recording density has led to the requirement for magnetic storage media having narrower data recording tracks, lower track pitch, i.e., more tracks per inch, and greater linear recording density along the data tracks. Greater linear recording density has led to a reduction in shield-to-shield spacing in the heads and reduced head-media spacing (HMS). At very low HMS, temperature-dependent mechanical distortions, such as thermal pole tip recession (TPTR), become more significant. TPTR effectively alters the HMS. TPTR is greater when the thermal coefficient of expansion (TCE) of the shield is substantially different form the TCE of materials used to form the substrate and insulation layers of the head.

Prior art top and bottom shields are each typically formed of a single layer of a magnetic material such as Permalloy or the like. Permalloy possesses favorable magnetic properties, such as relatively high permeability, low magnetostriction and low coercivity. However, Permalloy has a TCE of about $12 \times 10^{-6}$ per degree Centigrade (or Celsius) that is substantially higher than the TCE of $Al_2O_3$. TiC (about $8 \times 10^{-6}$ per degree Centigrade), which is typically used as a substrate material. Therefore, the TPTR of such prior art heads is usually high.

Embodiments of the present invention provide solutions to these and other problems, and offer other advantages over the prior art.

SUMMARY OF THE INVENTION

A magnetic head for reading information from a magnetic medium is provided. The magnetic head includes a substrate, having a substrate thermal coefficient of expansion, and a read element positioned above the substrate. The head also includes a shield, positioned above the substrate and adjacent the read element, which has a shield thermal coefficient of expansion that substantially matches the substrate thermal coefficient of expansion. The shield absorbs stray magnetic fields from the magnetic medium, which emanate from stored data that is adjacent to a data element that is directly beneath, and being currently read by, the magnetoresistive read element.

Other features and benefits that characterize embodiments of the present invention will be apparent upon reading the following detailed description and review of the associated drawings.

BRIEF DESCRIPTION OF THE DRAWINGS

FIG. 2-1 is a cross-sectional view of a magnetic read/write head and a magnetic disc taken along a plane normal to an air bearing surface of the read/write head.

FIG. 2-2 is a layered diagram of a reader portion of the current-in-plane (CIP) read/write head of FIG. 2-1.

FIG. 3-1 is a cross sectional view of a reader portion of a magnetic head in accordance with an embodiment of the present invention.

FIG. 3-2 illustrates a comparison of single and bilayer films on a substrate with an intermediate TCE value.

FIG. 4-1 is a cross-sectional view of a reader portion of a magnetic head in accordance with an embodiment of the present invention.

FIG. 4-2 illustrates plots of effective TCE for different multi-layered combinations with alternate layers formed of a material having a different TCE.

FIGS. 5-1, 5-2 and 6 are cross sectional views of reader portions of magnetic heads in accordance with embodiments of the present invention.

DETAILED DESCRIPTION OF ILLUSTRATIVE EMBODIMENTS

Figure 1:
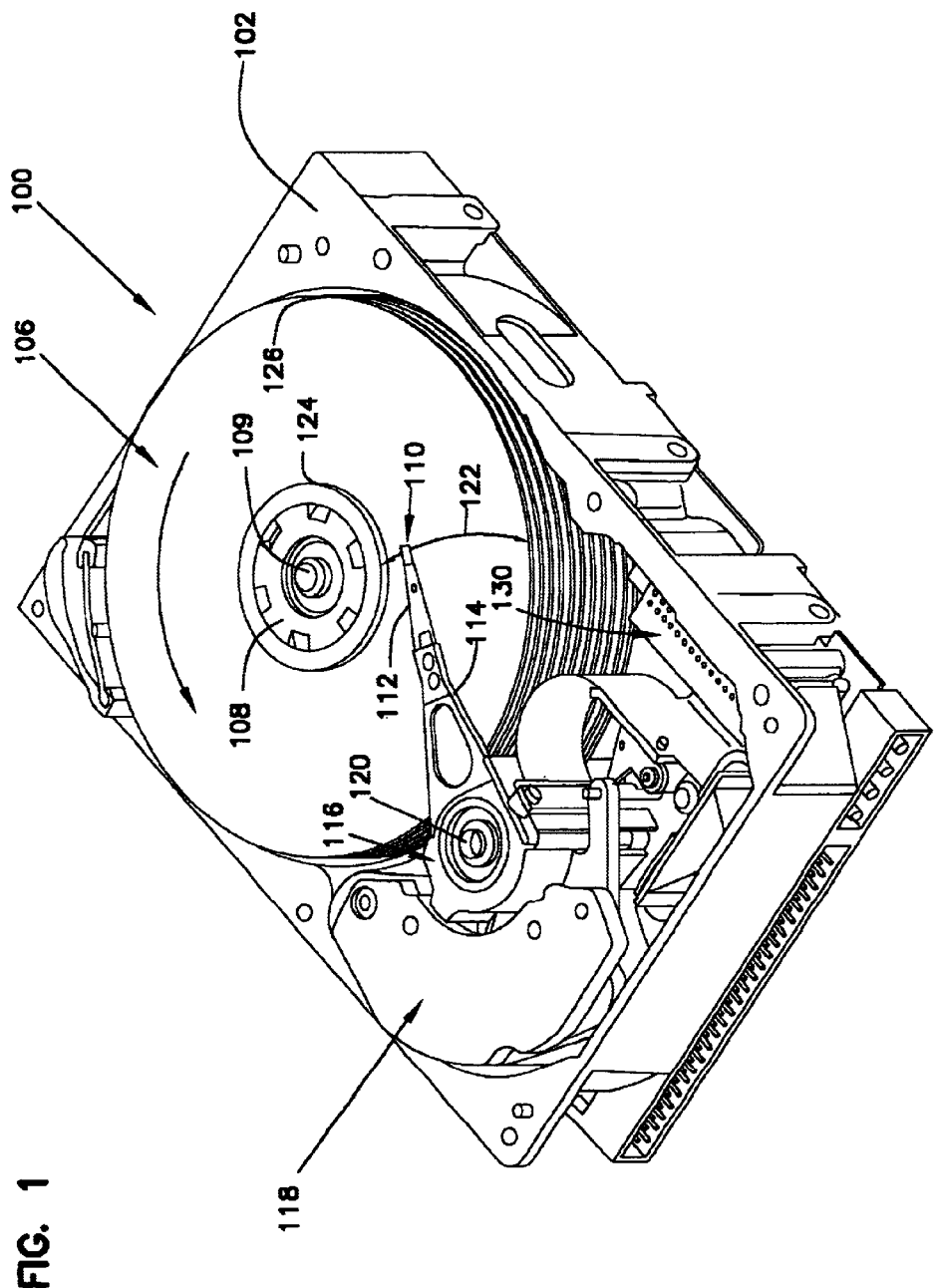
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Magnetic heads 110 may be read/write heads employed for recording information in multiple circular tracks on the respective disc surfaces as well as for reading information therefrom.

Figures 1, 2:
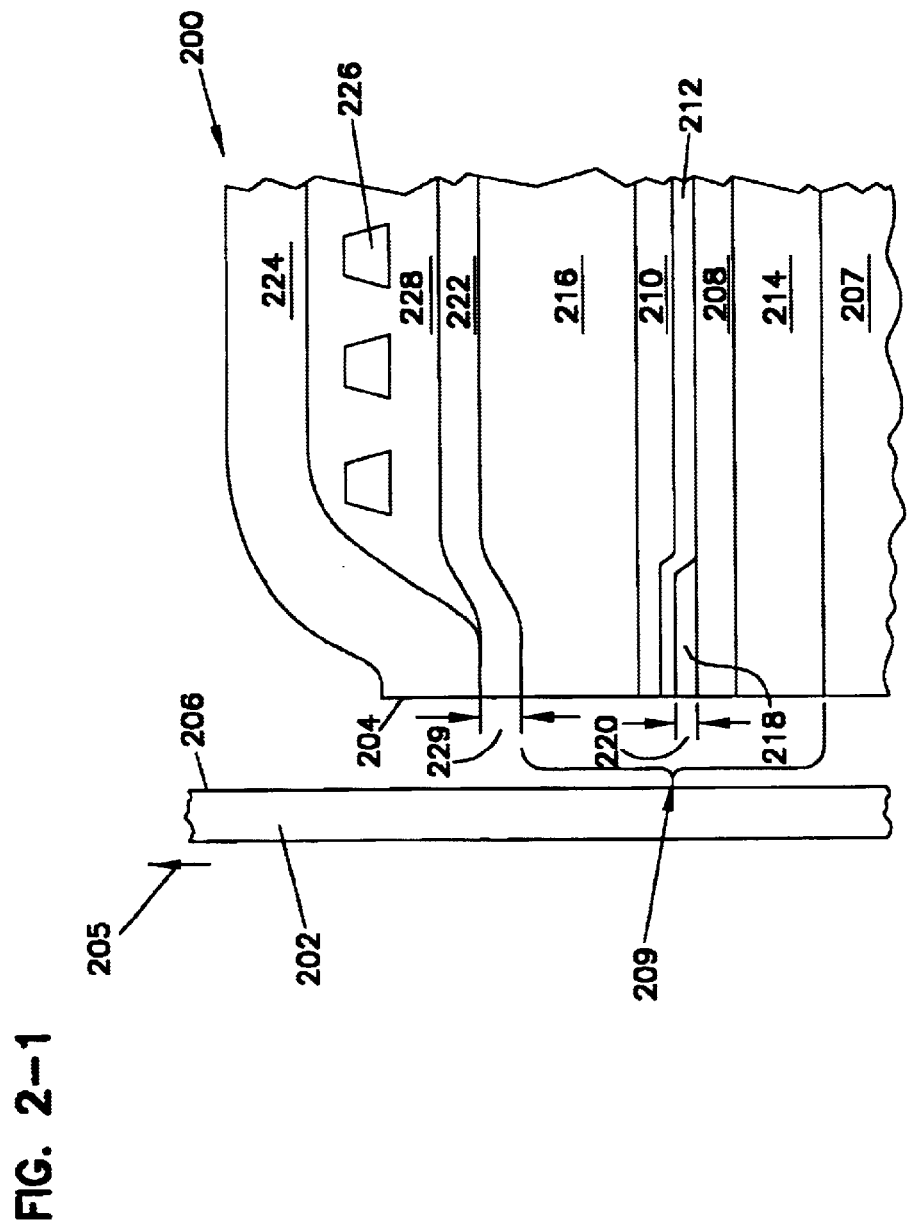
Figure 2:
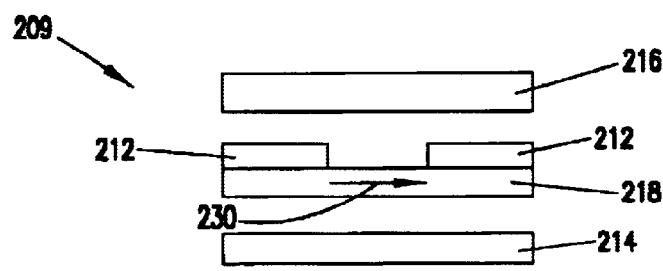

FIG. 2-1 is a cross-sectional view of a read/write head 200 and magnetic disc 202 taken along a plane normal to air bearing surface 204 of read/write head 200. FIG. 2-1 illustrates magnetic read/write head 200 and its placement relative to magnetic disc 202. Air bearing surface 204 of magnetic read/write head 200 faces disc surface 206 of magnetic disc 202. Magnetic disc 202 travels or rotates in a direction relative to magnetic read/write head 200 as indicated by arrow 205. The spacing between air bearing surface 204 and disc surface 206 is preferably minimized while avoiding contact between magnetic read head 200 and magnetic disc 202. In most cases, contact between magnetic head 200 and magnetic disc 202 would destroy both magnetic read head 200 and magnetic disc 202.

A reader portion 209 of read/write head 200 includes bottom gap layer 208, top gap layer 210, metal contact layer 212, bottom shield 214, which is formed on substrate 207, top shield 216, and read element 218. The reader 220 is located at the air bearing surface 204 between terminating ends of bottom gap layer 208 and metal contact layer 212. Metal contact layer 212 is positioned between bottom gap layer 208 and top gap layer 210. Read element 218 is positioned between terminating ends of bottom gap layer 208 and metal contact layer 212.

A writer portion of magnetic read/write head 200 includes bottom pole 216, write gap layer 222, top pole 224, conductive coil 226, and polymer layer 228. Write gap 229 is defined on air bearing surface 204 by write gap layer 222 between terminating ends of top pole 224 and bottom pole 216. Electrically conductive coils 226 are provided to generate magnetic fields across write gap 230 and are positioned in polymer layer 228 between top pole 224 and write gap layer 222. While FIG. 2 shows a single layer of conductive coils 226, it is understood in the art that several layers of conductive coils may be used separated by several polymer layers. Read/write head 200 is a merged MR head in which element 216 is employed both as top shield 216 in the reader portion and as bottom pole 216 in the writer portion. If read/write head 200 were a piggy-back MR head, top shield 216 and bottom pole 216 would be separate layers.

In read/write head 200, read element 218 operates in current-in-plane (CIP) mode. FIG. 2-2 illustrates a layered diagram of reader portion 209 of read/write head 200, showing the shield layers (214, 216), metal contacts 212 and read element 218 as they appear along air bearing surface (ABS) 204. In FIG. 2-2, spacing and insulating layers are omitted from reader portion 209 for clarity. Since read element 218 operates in CIP mode, sensing current I, indicated by arrow 230 in FIG. 2-2, passes in the plane of read element 218.

In prior art magnetoresistive heads, temperature-dependent mechanical distortions, such as TPTR, are relatively high because prior art shields are typically formed of a single layer of a magnetic material that usually has a TCE that is substantially different form the TCE of materials used to form the substrate and insulation layers of the head.

The present invention employs shields (214, 216) having a TCE that substantially matches the substrate TCE, i.e., the shield TCE is within about $2 \times 10^{-6}$ per degree Centigrade of the substrate TCE. In addition, shields (214, 216) have favorable magnetic properties such as a magnetic permeability greater than 100. Typically, the thickness of the each shield is less than about 3 microns and the thickness of the substrate is about 2 millimeters. Embodiments of the present invention are described in connection with FIGS. 3, 4, 5 and 6 below. In FIGS. 3, 4, 5 and 6, spacing and insulating layers are omitted from the reader portion for clarity.

Figures 1, 3:
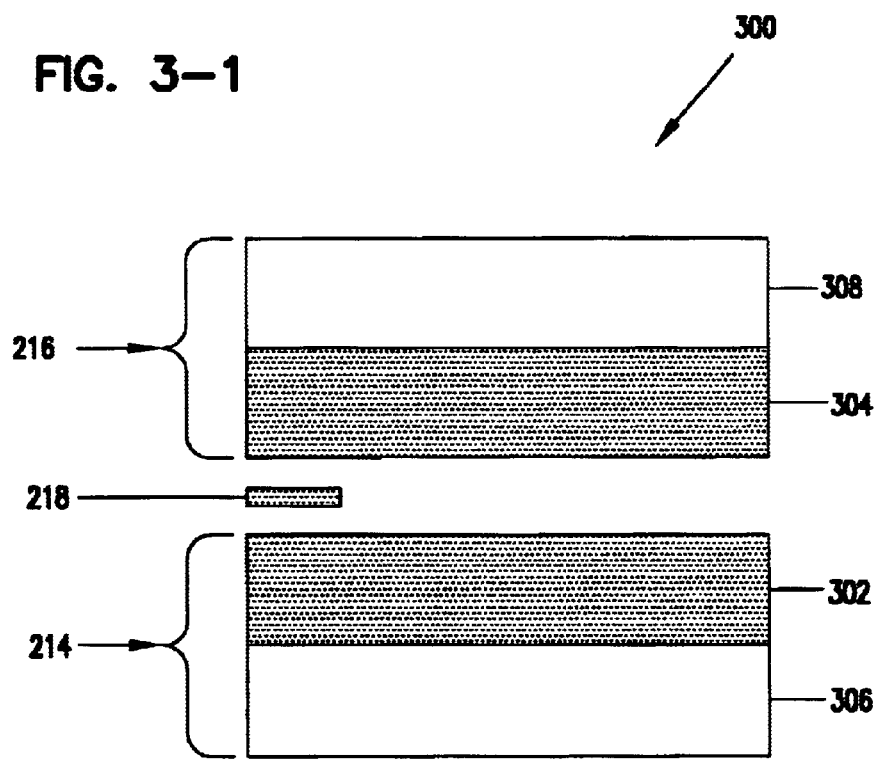
Figures 2, 3:
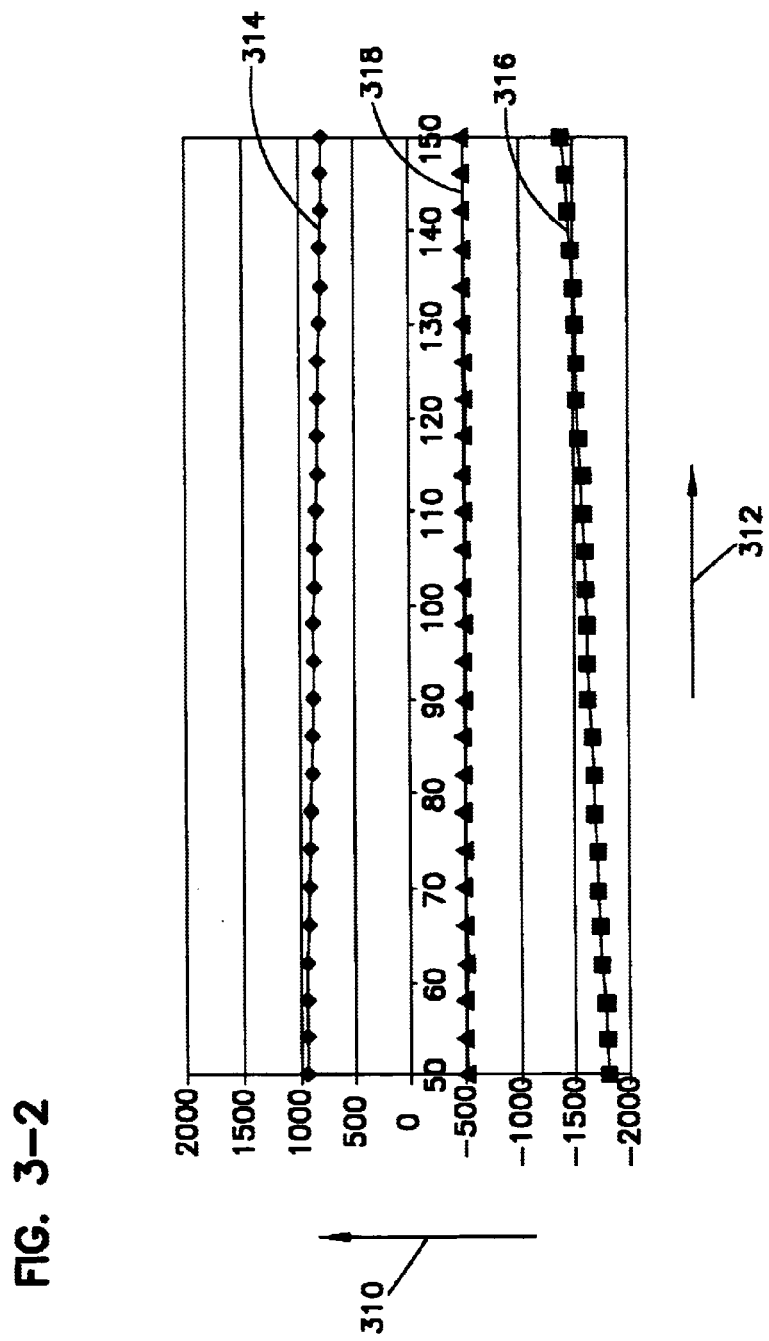

FIG. 3-1 is a cross-sectional view of a reader portion 300 of a magnetic head in accordance with an embodiment of the present invention. Bottom shield 214 and top shield 216 are each bi-layered and include a first layer (302, 304) formed of a magnetic material and a second layer (306, 308) formed of a non-magnetic material. The first layer or magnetic layer (302, 304), preferably positioned proximate the read element 218 as shown in FIG. 3, absorbs stray magnetic fields from adjacent tracks and transitions on the disc. The second layer or non-magnetic layer (306, 308) is positioned adjacent the first layer (302, 304).

FIG. 3-2 illustrates a comparison of single and bilayer films on a substrate with an intermediate TCE value. The plots of FIG. 3-2 represent measured wafer bow in arbitrary units (vertical axis 310) versus temperature in degrees Centigrade (horizontal axis 312). Plot 314 represents measurements for a 1000 Å film of NiFe. Plot 316 represents measurements for a 1000 Å film of Ta, and plot 318 represents measurements for a bilayer including a 500 Å monolayer of NiFe and a 500 Å monolayer of Ta. The slope of each plot represents the TCE of the material relative of the substrate TCE, which is a standard method to characterize the TCE of a thin film. FIG. 3-2 clearly indicates that the negative slope of plot 314 (NiFe TCE>substrate TCE) and positive slope of plot 316 (Ta TCE<substrate TCE) can be combined to give the effective zero slope of plot 318 and (combined NiFe and Ta TCE=substrate TCE) for the NiFe and Ta bilayer.

Figures 1, 4:
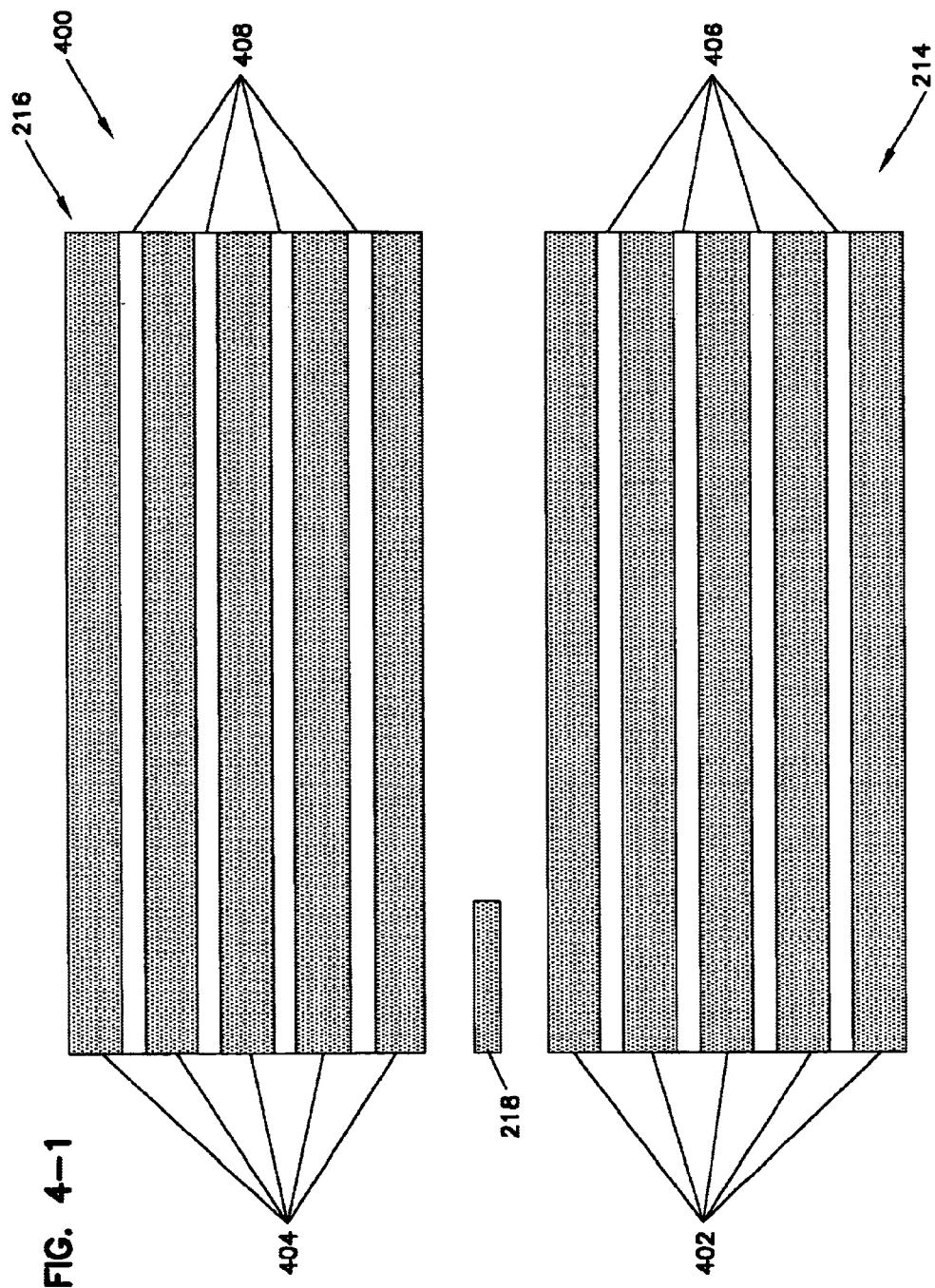
Figures 2, 4:
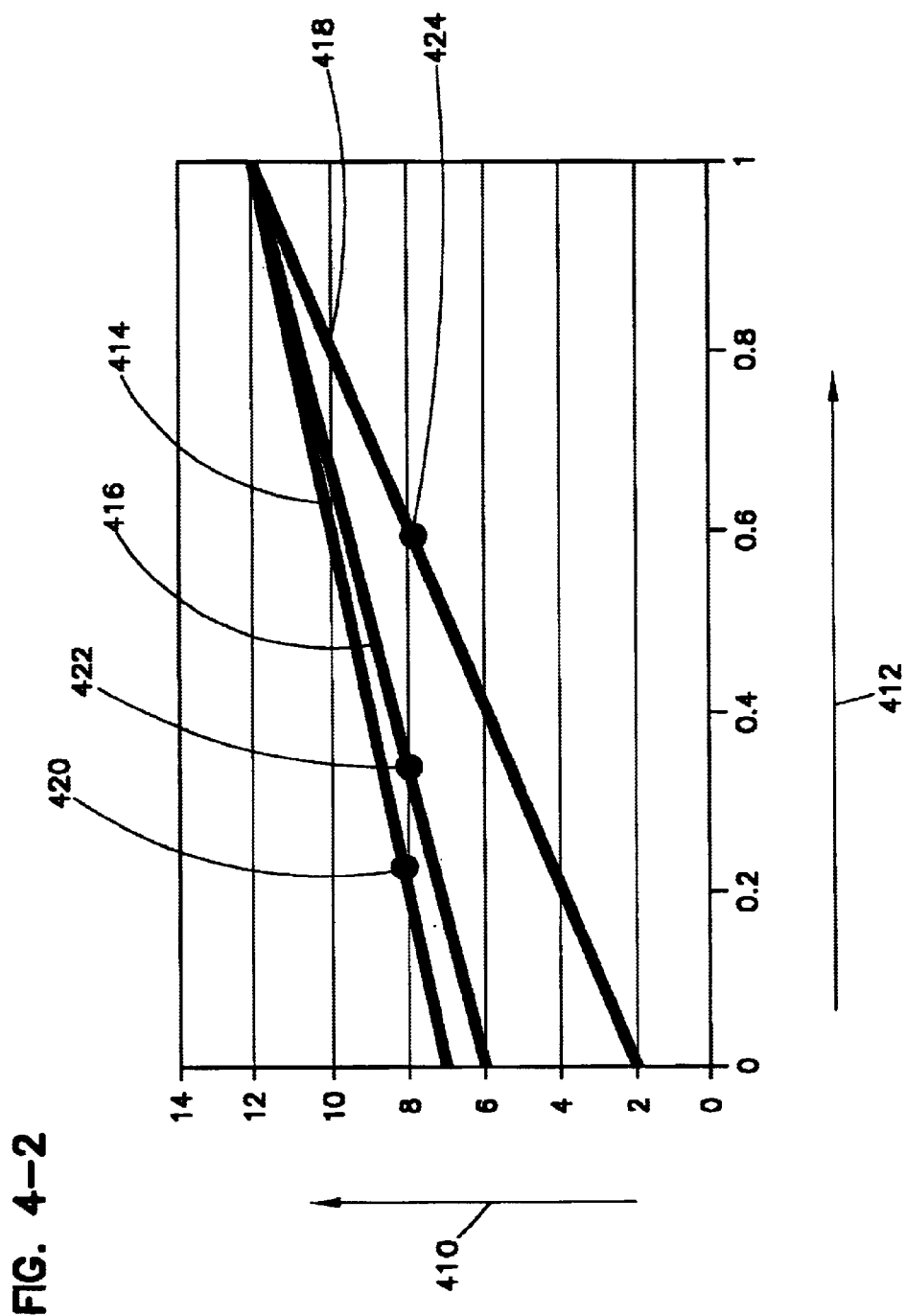
Figures 1, 5:
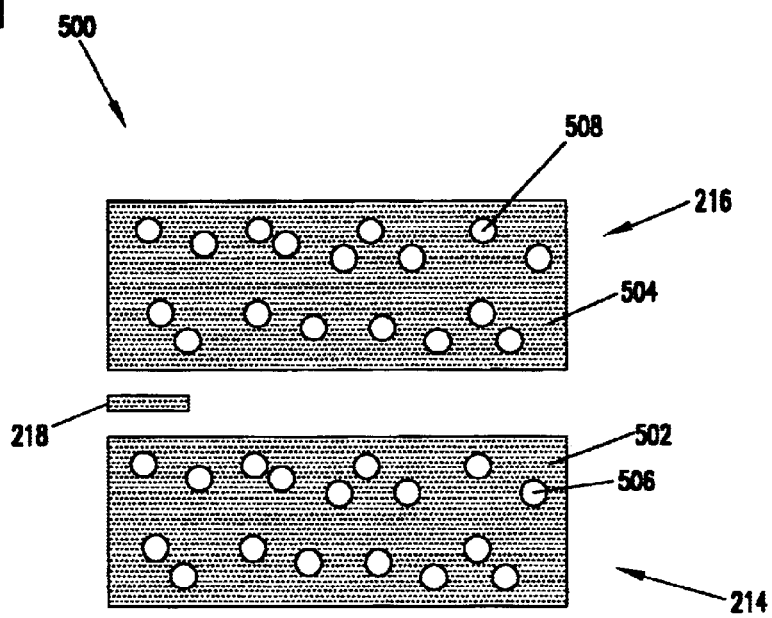

FIG. 4-1 shows a cross-sectional view of a reader portion 400 of a magnetic head in accordance with another embodiment of the present invention. The embodiment shown in FIG. 4-1 is similar to that shown FIG. 3-1, but includes multi-layered instead of bi-layered shields. Thus, in FIG. 4-1, bottom shield 214 and top shield 216 are each multi-layered and include a set of magnetic layers (402, 404) interspersed with a set of non-magnetic layers (406, 408). As in the case of the bi-layered system described in connection with FIGS. 3-1 and 3-2 above, the effective TCE of the shields (214, 216) will depend upon the TCE, the thicknesses, and the multi-layer period of the magnetic and the non-magnetic layers. Permalloy is a suitable material for the magnetic layers.

In general, the thin film multilayer systems, the effective TCE of the multilayer is a function of the TCE and the thickness of each individual layer in the system. FIG. 4-2 shows plots representing effective TCE values for two-component multi-layered systems utilizing alternate layers that are each formed of a material having a different TCE and thickness. The thickness of each thin film layer is typically less than 3 microns. Plots 414, 416 and 418 represent multilayered systems that each include a first layer formed of Permalloy that has a TCE of about $12 \times 10^{-6}$ per degree Centigrade. The second layer of the system represented by plot 414 is formed of a material having a TCE of $7 \times 10^{-6}$ per degree Centigrade. The system represented by plot 416 includes a second layer formed of a material with a TCE of $6 \times 10^{-6}$ per degree Centigrade, and in the system represented by plot 418, the second layer is formed of a material having a TCE of $2 \times 10^{-6}$ per degree Centigrade. Vertical axis 410 denotes the effective $TCE \times 10^{-6}$ per degree Centigrade and horizontal axis 412 is the thickness of the first layer expressed as a fraction of the thickness of the multilayered system. Thus, a target effective TCE of $8 \times 10^{-6}$ per degree Centigrade, which is the TCE value of an $Al_2O_3$.—TiC substrate, is represented by points 420, 422 and 424 on plots 414, 416 and 418, respectively. As can be seen in FIG. 4-2, shown on horizontal axis 412, is 0.2 or 20% of the thickness of the multilayered system. Thus, the thickness of the second layer corresponding to point 420 is 0.8 or 80% of the system thickness. At point 422, the thickness of the first layer is about 0.3 or 30% of the system thickness and the second layer is 0.7 or 70% of the system thickness. At point 424, the thickness of the first layer is about 0.6 or 60% of the system thickness and the second layer is 0.4 or 40% of the system thickness. Thus, the shields (214, 216) can be formed of magnetic layers (402, 404) and non-magnetic layers (406, 408) of suitable thicknesses and TCE, to obtain an effective shield TCF that substantially matches the substrate TCE. The optimal TCE can be obtained by suitable material and layer thickness and choice.

Permalloy is a suitable material for the magnetic layers (402, 404). Other material choices for the magnetic layers include NiFeCo, FeN, CoZrTa, CoZrNb and other NiFe alloys. The non-magnetic layers (406, 408) may be formed from materials such as Tantalum (Ta), Chromium (Cr), Rhodium (Rh), Molybdenum (Mo), Tungsten (W), Copper (Cu), etc.

Figures 2, 5:
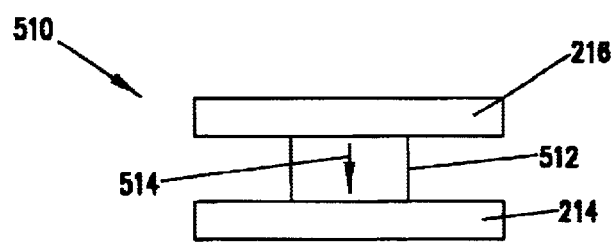

FIG. 5-1 illustrates a cross-sectional view of a reader portion 500 of a magnetic head in accordance with a third embodiment of the present invention. In FIG. 5-1, shields (214, 216) utilize a similar mechanical property described above in connection with FIGS. 3 and 4, but include materials in composite form instead of in discrete layers. As can be seen in FIG. 5-1, magnetic material (506, 508) is assimilated in non-magnetic material (502, 504). A suitable combination of NiFe and Copper (Cu) in composite form may be utilized to form shields (214, 216) with an effective shield TCE that substantially matches the substrate TCE. The use of Cu in shield (214, 216) provides good electrical conductivity and is therefore very suitable for use in a current-perpendicular-to-plane (CPP) head described in connection with FIG. 5-2 below.

FIG. 5-2 illustrates a very simplified block diagram of a reader portion 510 of a magnetic head including a read element 512 which operates in CPP mode. As can be seen in FIG. 5-2, current I, indicated by arrow 514, flows in a direction perpendicular to the plane of read element 512. Shields (214, 216) of the CPP head include a combination of magnetic and electrically conductive materials, and are therefore capable of absorbing stray magnetic fields and also functioning as electrical leads or contacts. Thus, reader portion 510 does not include any lateral electrical contacts, such as contacts 212, of the CIP head shown in FIG. 2-2.

Figure 6:
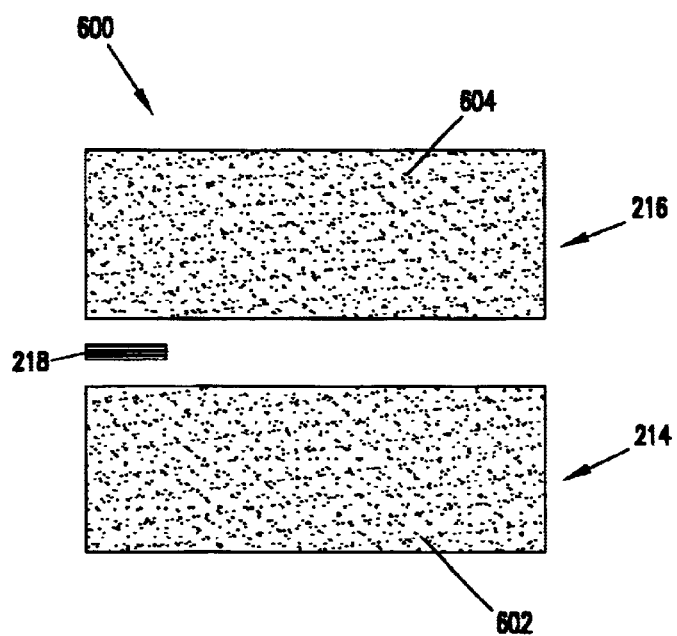

FIG. 6 illustrates a reader portion 600 of a magnetic head in accordance with an embodiment of the present invention. Again, the shields (214, 216) utilize similar mechanical properties described in connection with FIGS. 3, 4, and 5-1, but include nano-structured material systems (602, 604) instead of a composite system of relatively large particles or discrete layers. Examples of nano-structured materials that can be utilized for shields (214, 216) include the class of Fe—M—O material where M may be Ta, Nb, Hf or Zr. These materials typically have grain sizes of about 10 nm within an oxide matrix. The TCE of these materials lies between the relatively high TCE of a metal and a relative low TCE of an oxide and therefore substantially matches the TCE of the substrate. In addition, these materials have a relatively high permeability, low magnetostriction and low coercivity.

Figure 7:
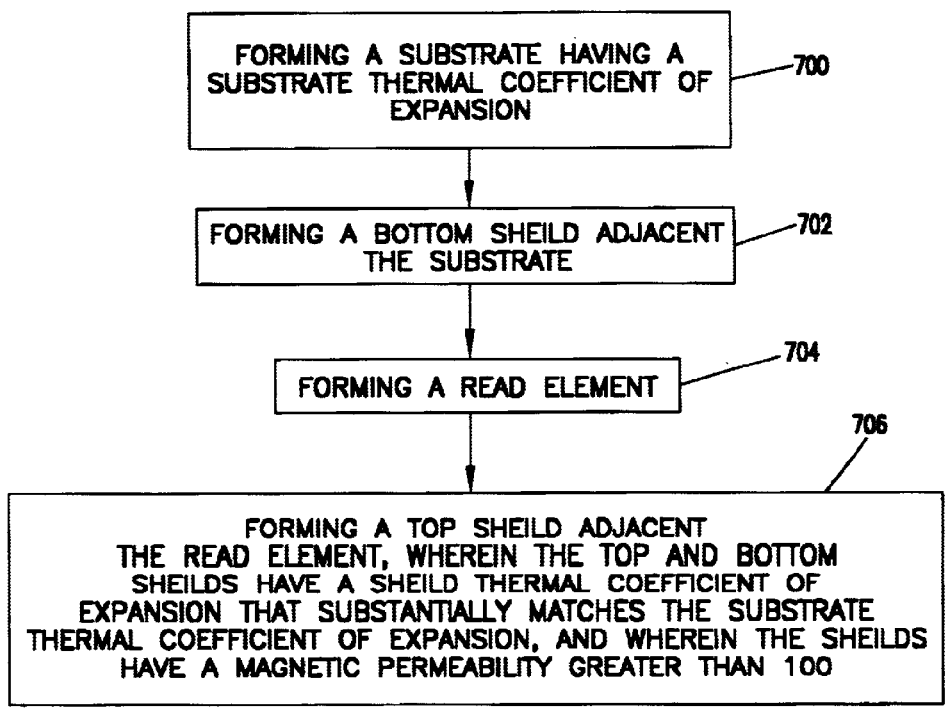
FIG. 7 is a flow chart representing a method of forming a magnetic head according to an illustrative embodiment of the present invention.

FIG. 7 is a flow chart representing a method of forming a magnetic head according to an illustrative embodiment of the present invention. At step 700, a substrate having a substrate thermal coefficient of expansion is formed. At step 702, a bottom shield is formed adjacent the substrate. The shield has a magnetic permeability greater than 100. At step 704, a read element is formed. At step 706, a top shield is formed adjacent the read element. The top and bottom shields have a shield thermal coefficient of expansion that substantially matches the substrate thermal coefficient of expansion. The shields have a magnetic permeability greater than 100.

In general, shields for MR heads in accordance with the above embodiments may be formed using known techniques such as sputtering, plating, etc.

The choice of materials and the number of materials and layers that can be utilized for the shields is not restricted to the embodiments and examples included above. In general, the present invention includes any material or combination of materials and layers that provide a good balance between magnetic and thermal-mechanical properties and can be employed to form a shield for a MR head. Furthermore, other thermal-mechanical properties in addition to the TCE must be considered for optimal results. For example, the Youngs modulus of each component material also contributes to the net thermal expansion of the composite structure. Specific choices of shield materials will depend upon the other materials employed in the head, which include the substrate and dielectric layers. In addition, the opportunity for application of these concepts to engineer other properties such as electrical conductivity in the shields are significant and important for future CPP reader technology.

In summary, a magnetic head (such as 200) is provided, which includes a substrate (such as 207) having a substrate thermal coefficient of expansion and a read element (such as 218) positioned above the substrate (such as 207). The magnetic head (such as 200) also includes a shield (such as 214, 218) positioned above the substrate (such as 207) and adjacent the read element (such as 218). The shield (such as 214, 218) has a shield thermal coefficient of expansion that substantially matches the substrate thermal coefficient of expansion. In addition, the shield (such as 214, 218) absorbs stray magnetic fields from the magnetic medium, which emanate form stored data that is adjacent to a data element that is directly beneath, and being currently read by, the magnetoresistive read element.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the fall extent indicated by the broad general meaning of the terms in which the appended claims are expressed. For example, the particular elements may vary depending on the particular application for the magnetic head while maintaining substantially the same functionality without departing from the scope and spirit of the present invention. In addition, although the preferred embodiment described herein is directed to a shield employed in a magnetic head for a disc storage system, it will be appreciated by those skilled in the art that the teachings of the present invention can be applied to any type of storage system or device which writes and/or senses magnetically, without departing from the scope and spirit of the present invention.

What is claimed is:

1. A magnetic head for reading information from a magnetic medium, comprising:
   a substrate having a substrate thermal coefficient of expansion;
   a magnetoresistive read element positioned above the substrate; and
   a shield positioned above the substrate and adjacent the read element, the shield having a shield thermal coefficient of expansion;
   wherein the shield thermal coefficient of expansion substantially matches the substrate thermal coefficient of expansion, and wherein the shield is adapted to absorb stray magnetic fields from the magnetic medium, which emanate from stored data that is adjacent to a data element that is directly beneath and read by the magnetoresistive read element.

2. The apparatus of claim 1 wherein the magnetic permeability of the shield is greater than 100.

3. The apparatus of claim 1 wherein the shield is a bottom shield positioned between the substrate and the magnetoresistive read element.

4. The apparatus of claim 1 wherein the shield is a top shield positioned above the substrate and the magnetoresistive read element.

5. The apparatus of claim 4 wherein the top shield is a shared pole of a merged magnetoresistive read/write head.

6. The apparatus of claim 1 wherein the shield comprises a first layer formed of a magnetic material and a second layer formed of a non-magnetic material, the first layer having a first thermal coefficient of expansion and the second layer having a second thermal coefficient of expansion with the first thermal coefficient of expansion being substantially higher than the second thermal coefficient of expansion, and wherein the first thermal coefficient of expansion and the second thermal coefficient of expansion combine to provide the shield thermal coefficient of expansion.

7. The apparatus of claim 6 wherein the non-magnetic material is selected form the group consisting of Tantalum (Ta), Chromium (Cr), Rhodium (Rh), Molybdenum (Mo), Tungsten (W) and Copper (Cu).

8. The apparatus of claim 6 wherein the magnetic material is a soft magnetic alloy.

9. The apparatus of claim 8 wherein the soft magnetic alloy is selected from the group consisting of Permalloy, NiFeCo, FeN, CoZrTa and CoZrNb.

10. The apparatus of claim 1 wherein the shield comprises a first plurality of layers formed of a magnetic material and a second plurality of layers formed of a non-magnetic material, the first plurality of layers having a first thermal coefficient of expansion and the second plurality of layers having a second thermal coefficient of expansion with the first thermal coefficient of expansion being substantially higher than the second thermal coefficient of expansion, and wherein the first thermal coefficient of expansion and the second thermal coefficient of expansion combine to provide the shield thermal coefficient of expansion.

11. The apparatus of claim 10 wherein the non-magnetic material is selected from the group consisting of Tantalum (Ta), Chromium (Cr), Rhodium (Rh), Molybdenum (Mo), Tungsten (W) and Copper (Cu).

12. The apparatus of claim 10 wherein the magnetic material is a soft magnetic alloy.

13. The apparatus of claim 12 wherein the soft magnetic alloy is selected from the group consisting of Permalloy, NiFeCo, FeN, CoZrTa and CoZrNb.

14. The apparatus of claim 1 wherein the shield is a composite layer formed of a magnetic material having a first thermal coefficient of expansion and a non-magnetic material having a second thermal coefficient of expansion with the first thermal coefficient of expansion being substantially higher than the second thermal coefficient of expansion, and wherein the first thermal coefficient of expansion and the second thermal coefficient of expansion combine to provide the shield thermal coefficient of expansion.

15. The apparatus of claim 14 wherein the composite layer including Invar ($Ni_{34}Fe_{64}$) and Copper (Cu).

16. The apparatus of claim 1 wherein the shield is formed of an oxide based magnetic material.

17. The apparatus of claim 16 wherein the oxide based magnetic material is Fe—M—O, with M representing at least one material selected from the group consisting of Ta, Nb, Hf and Zr.

18. The apparatus of claim 1 wherein the read element operates in current-perpendicular-to-plane (CPP) mode and wherein the shield includes an electrically conductive material.

19. The apparatus of claim 18 wherein the electrically conductive material is Copper (Cu).

20. A disc storage system employing the magnetic head of claim 1.

21. A method of forming a magnetic head for reading information from a magnetic medium, the method comprising steps of:
   (a) forming a substrate having a substrate thermal coefficient of expansion;
   (b) forming a read element; and
   (c) forming a shield adjacent the read element, the shield having a shield thermal coefficient of expansion, wherein the shield thermal coefficient of expansion substantially matches the substrate thermal coefficient of expansion, and wherein the shield is adapted to absorb stray magnetic fields from the magnetic medium, which emanate form stored data that is adjacent to a data element that is directly beneath and read by the magnetoresistive read element.

22. The method of claim 21 wherein the magnetic permeability of the shield is greater than 100.

23. The method of claim 21 wherein the shield is a bottom shield positioned between the substrate and the magnetoresistive read element.

24. The method of claim 21 wherein the shield is a top shield positioned above the substrate and the magnetoresistive read element.

25. The method of claim 24 wherein the top shield is a shared pole of a merged magnetoresistive read/write head.

26. The method of claim 21 wherein the forming a shield step (c) comprising forming a first layer of a magnetic material and a second layer of a non-magnetic material, the first layer having a first thermal coefficient of expansion and the second layer having a second thermal coefficient of expansion with the first thermal coefficient of expansion being substantially higher than the second thermal coefficient of expansion, and wherein the first thermal coefficient of expansion and the second thermal coefficient of expansion combine to provide the shield thermal coefficient of expansion.

27. The method of claim 21 wherein the forming a shield step (c) comprising forming a first plurality of layers of a magnetic material and a second plurality of layers of a non-magnetic material, the first plurality of layers having a first thermal coefficient of expansion and the second plurality of layers having a second thermal coefficient of expansion with the first thermal coefficient of expansion being substantially higher than the second thermal coefficient of expansion, and wherein the first thermal coefficient of expansion and the second thermal coefficient of expansion combine to provide the shield thermal coefficient of expansion.

28. The method of claim 21 wherein the forming a shield step (c) comprises forming a composite layer of a magnetic material having a first thermal coefficient of expansion and a non-magnetic material having a second thermal coefficient of expansion with the first thermal coefficient of expansion being substantially higher than the second thermal coefficient of expansion, and wherein the first thermal coefficient of expansion and the second thermal coefficient of expansion combine to provide the shield thermal coefficient of expansion.

29. The method of claim 21 wherein the forming a shield step (c) is carried out with an oxide based magnetic material.

30. The method of claim 21 wherein forming the read element step (b) includes forming the read element to operate in current-perpendicular-to-plane (CPP) mode, and wherein the forming a shield step (c) includes forming the shield including an electrically conductive material.

31. A disc drive employing a magnetic head formed by the method of claim 21.

32. A magnetic head comprising:
   a read element formed above a substrate having a substrate thermal coefficient of expansion; and
   magnetic shielding means for the read element, said means having a thermal coefficient of expansion that substantially matches the substrate thermal coefficient of expansion, and wherein said means adapted to absorb stray magnetic fields from the magnetic medium, which emanate form stored data that is adjacent to a data element that is directly beneath, and being currently read by, the magnetoresistive read element.

* * * * *

UNITED STATES PATENT AND TRADEMARK OFFICE
CERTIFICATE OF CORRECTION

PATENT NO. : 6,775,108 B2
DATED : August 10, 2004
INVENTOR(S) : Kief et al.

It is certified that error appears in the above-identified patent and that said Letters Patent is hereby corrected as shown below:

Column 7,
Line 45, replace "form" with -- from --.

Column 8,
Lines 56 and 67, replace "comprising" with -- comprises --.

Signed and Sealed this

Twenty-eighth Day of September, 2004

JON W. DUDAS
*Director of the United States Patent and Trademark Office*